United States Patent
Son et al.

(10) Patent No.: US 10,195,947 B2
(45) Date of Patent: Feb. 5, 2019

(54) METHOD AND SYSTEM OF OPERATING ON-BOARD CHARGER FOR ECO-FRIENDLY VEHICLE

(71) Applicant: Hyundai Motor Company, Seoul (KR)

(72) Inventors: Gi Bong Son, Gyeonggi-Do (KR); Hui Sung Jang, Gyeonggi-Do (KR); Hyun Wook Seong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 216 days.

(21) Appl. No.: 15/205,710

(22) Filed: Jul. 8, 2016

(65) Prior Publication Data

US 2017/0101020 A1    Apr. 13, 2017

(30) Foreign Application Priority Data

Oct. 8, 2015   (KR) ........................ 10-2015-0141352

(51) Int. Cl.
| | |
|---|---|
| *B60L 1/00* | (2006.01) |
| *B60L 3/00* | (2006.01) |
| *H02G 3/00* | (2006.01) |
| *B60L 11/18* | (2006.01) |
| *H02M 1/42* | (2007.01) |
| *H02M 3/04* | (2006.01) |

(52) U.S. Cl.
CPC ........... *B60L 11/1809* (2013.01); *H02M 1/42* (2013.01); *H02M 3/04* (2013.01)

(58) Field of Classification Search
CPC .......... G06Q 50/06; H02J 3/381; H02J 7/007; H02J 7/35; H02J 3/32; H02J 7/0047; H02J 2007/005; Y04S 10/54; Y04S 10/545; Y02E 40/76
See application file for complete search history.

(56) References Cited

U.S. PATENT DOCUMENTS

| | | | |
|---|---|---|---|
| 6,191,500 B1 * | 2/2001 | Toy ........................... | H02J 3/46 307/64 |
| 2008/0067973 A1 * | 3/2008 | Ishikawa ................. | B60K 6/445 320/104 |
| 2008/0157594 A1 * | 7/2008 | Peterson ............... | B60L 11/123 307/10.1 |
| 2009/0242291 A1 * | 10/2009 | Sagawa .................. | B60K 15/05 180/65.265 |

(Continued)

FOREIGN PATENT DOCUMENTS

| | | |
|---|---|---|
| JP | 2002-252935 A | 9/2002 |
| JP | 2011-223796 A | 4/2011 |

(Continued)

*Primary Examiner* — Alfonso Perez Borroto
*Assistant Examiner* — Esayas Yeshaw
(74) *Attorney, Agent, or Firm* — Mintz Levin Cohn Ferris Glovsky and Popeo, P.C.; Peter F. Corless (57) ABSTRACT

A method and system of operating an on-board charger (OBC) for an eco-friendly vehicle are provided to improve durability and extend a lifespan of the OBC during the charging of a vehicle battery using a commercial power source. The system improves durability and extends a lifespan of the OBC including a power factor correction (PFC) part by alternately operating a first boost converter and a second boost converter of the PFC part during the charging of a battery by using a commercial power supplier (an in-cable control box (ICCB)).

10 Claims, 5 Drawing Sheets

(56) References Cited

U.S. PATENT DOCUMENTS

| | | | |
|---|---|---|---|
| 2010/0133900 A1* | 6/2010 | King | B60L 11/1816 307/9.1 |
| 2010/0277132 A1 | 11/2010 | Hara et al. | |
| 2011/0273142 A1* | 11/2011 | Jin | H02M 1/4225 320/137 |
| 2012/0022738 A1* | 1/2012 | Kato | H02J 5/00 701/22 |
| 2013/0271077 A1* | 10/2013 | Kim | B60L 11/1811 320/109 |
| 2014/0077752 A1* | 3/2014 | Barsukov | H02J 7/0016 320/103 |
| 2015/0255984 A1* | 9/2015 | Higashi | B60L 11/18 700/297 |
| 2015/0303737 A1* | 10/2015 | Steinbuchel, IV | B60L 3/0069 320/109 |
| 2016/0372775 A1* | 12/2016 | Steiner | H01M 8/186 |
| 2017/0285112 A1* | 10/2017 | Dou | G01R 31/3682 |

FOREIGN PATENT DOCUMENTS

| | | |
|---|---|---|
| JP | 2011-167019 A | 8/2011 |
| JP | 2012-065391 A | 3/2012 |
| JP | 2012-085489 A | 4/2012 |
| JP | 2014-017891 | 1/2014 |
| KR | 10-2011-0105919 A | 9/2011 |
| KR | 10-1449305 | 6/2013 |
| KR | 10-2015-0053452 | 11/2013 |

\* cited by examiner

FIG. 1

RELATED ART

METHOD AND SYSTEM OF OPERATING ON-BOARD CHARGER FOR ECO-FRIENDLY VEHICLE

CROSS-REFERENCE TO RELATED APPLICATION

This application claims under 35 U.S.C. § 119(a) the benefit of Korean Patent Application No. 10-2015-0141352 filed on Oct. 8, 2015, the entire contents of which are incorporated herein by reference.

BACKGROUND (a) Technical Field

The present disclosure relates to a method and system of operating an on-board charger for an eco-friendly vehicle, and more particularly, to a method and system of operating an on-board charger for an eco-friendly vehicle to improve durability of an on-board charger during charging a battery in a vehicle and extend a service life by using a commercial power source.

(b) Background Art

In general, an eco-friendly vehicle, such as an electric vehicle (EV) or a plug-in hybrid electric vehicle (PHEV), using an electric motor as a driving source for operating a vehicle is equipped with a battery that supplies electricity to the electric motor, and the battery is charged using electric vehicle supply equipment (EVSE) extraneous to the vehicle or is connected with a general external alternating current power source and charged using an on-board charger (OBC) that is a battery charger mounted within the vehicle. When alternating current power extraneous to a vehicle is applied to the vehicle, the OBC is configured to charge the battery by converting the alternating current (AC) power to direct current (DC) power chargeable in the battery.

The above information disclosed in this section is merely for enhancement of understanding of the background of the invention and therefore it may contain information that does not form the prior art that is already known in this country to a person of ordinary skill in the art.

SUMMARY

The present invention provides a method and system of operating an on-board charger (OBC) for an eco-friendly vehicle, which alternately operate a first boost converter and a second boost converter of a power factor correction (PFC) part formed within the OBC during the charging of a battery by using a commercial power supplier (e.g., an in-cable control box (ICCB)), to improve durability and increase a service life (e.g., lifespan) of the OBC including the PFC part.

In one aspect, the present invention provides a method of operating an on-board charger (OBC) mounted within a vehicle that may include: determining whether a power supplier connected to the OBC is a commercial power supplier configured to supply commercial alternating current power; accumulating and counting the number of times of charging a battery whenever the commercial power supplier is connected with the OBC; and alternately operating a plurality of boost converters configured to adjust an on-duty of an input current of the OBC based on the counted number of times of charging the battery.

In an exemplary embodiment, the OBC may include a first boost converter and a second boost converter configured to adjust the on-duty of the input current in different phases, and when the counted number of times of charging the battery is an odd number, the OBC may be configured to adjust the on-duty of the input current by operating one of the first and second boost converters, and when the counted number of times of charging the battery is an even number, the OBC may be configured to adjust the on-duty of the input current by operating the other of the first and second boost converters.

In addition, the method may include determining the on-duty of the input current input into the boost converter in subordination to a ratio of an input current, which may be applied to a boost converter selected based on the number of times of charging the battery among the plurality of boost converters and a current command, which is determined as a command value of the input current. When the accumulated and counted number of times of charging the battery reaches a predetermined maximum value, the number of times of charging the battery may be reset to an initial value. The method may further include determining whether the power supplier connected to the OBC is the commercial power supplier based on an input voltage and an input current applied to the plurality of boost converters.

The method of operating the OBC for the eco-friendly vehicle according to the present invention has the effects below.

First, it may be possible to solve problems regarding durability and reliability of the OBC, which occur due to an operation of only one specific boost converter during the charging of a battery by using an ICCB.

Second, it may be possible to decrease a problem of deterioration in durability of a corresponding boost converter due to an operation of only one specific boost converter, leading to current imbalance generated when a battery requires charging by operating both of the boost converters due to the deterioration in durability of the corresponding boost converter.

Third, it may be possible to solve a problem of deterioration in control performance generated due to relative deterioration in durability of a specific boost converter due to an operation of only one specific boost converter.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Reference numerals set forth in the Drawings include reference to the following elements as further discussed below:

10: PFC part
11: first boost converter
12: second boost converter
20: DC/DC converter part
30: controller
31: current controller
40: battery It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Figure 1:
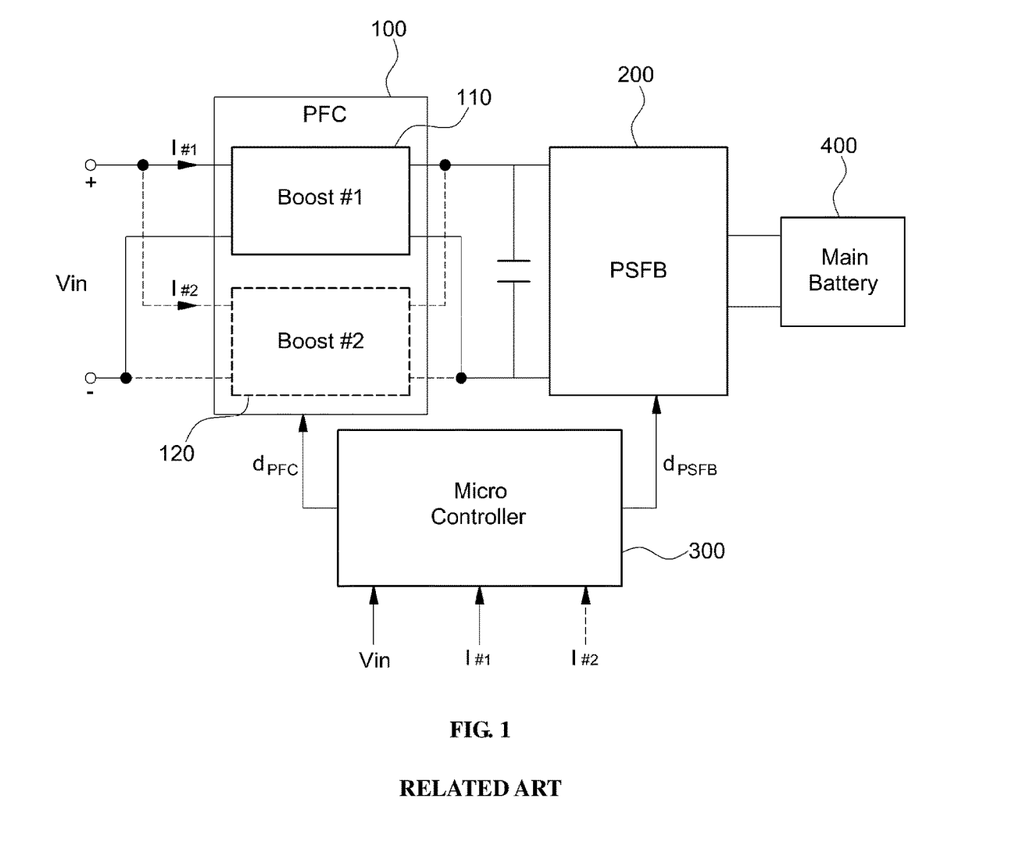
FIG. 1 is a diagram for describing a method of operating an on-board charger (OBC) for an eco-friendly vehicle in the related art.

First, a method of operating an on-board charger (OBC) for an eco-friendly vehicle in the related art will be described. FIG. 1 is a configuration diagram schematically illustrating an OBC mounted in an eco-friendly vehicle in the related art. As shown in FIG. 1, the OBC for the eco-friendly vehicle includes a power factor correction (PFC) part 100, a DC/DC converter part 200, and a controller 300 configured to operate the respective elements.

As is known, the PFC part 100 is configured to adjust a power factor, and the DC/DC converter part 200 is configured to convert a voltage input from the PFC part 100 into a direct current voltage for charging a battery 400. Referring to FIG. 1, the PFC part 100 includes a first boost converter 110 and a second boost converter 120 configured to adjust an input current of the OBC, and the first boost converter 110 and the second boost converter 120 are connected in parallel and to adjust an on-duty of the input current while being alternately operated at a phase difference of 180°. In other words, the PFC part 100 of the OBC may be formed of the two boost converters 110 and 120 operated in different phases and may adjust and output an on-duty (or a duty ratio) of the input current with two phases.

The OBC for the eco-friendly vehicle in the related art, in which the PFC part 100 configured to adjust an input current applied to the OBC is operable in an interleaving method, has a substantial rated charging capacity when charging the battery using general electric vehicle supply equipment (EVSE), and thus the OBC is configured to charge the battery by operating both the first boost converter 110 and the second boost converter 120. However, when the OBC charges the battery using a power supplier, such as an in-cable control box (ICCB), configured to supply household electricity (or a commercial alternating current power source), the charging capacity is a half or less of the charging capacity during the charging using the general EVSE, and thus the OBC is configured to operate only one of the boost converters 110 and 120 of the PFC part 100.

In other words, in the PFC part of the OBC for the eco-friendly vehicle in the related art, only one boost converter is operated when the battery is charged using the ICCB having a minimal charging capacity, compared to the charging of the battery using the general EVSE. Particularly, the interleaving method refers to a method of generating an on-duty by delaying a phase by 360°/N for each phase when generating an on-duty with a plurality of phases (for example, N), not one phase. However, the method of operating the OBC in the related art has a problem in degrading durability of manual and active devices (e.g., an inductor, a switch, a diode, and the like) of the corresponding boost converter operated during the charging of the battery using the ICCB and a problem of rapidly decreasing a lifespan of the OBC.

When the durability of the devices (e.g., an inductor, a switch, a diode, and the like) configuring a predetermined boost converter operated during the charging of the battery by using the ICCB is degraded, inductance, internal resistance, and the like may be changed, thereby causing current imbalance of the respective phases adjusted by the first and second boost converters during the charging of the battery by using the general EVSE and deterioration in control performance Hereinafter, the present invention will be described so that those skilled in the art may easily carry out the present invention.

Figure 2:
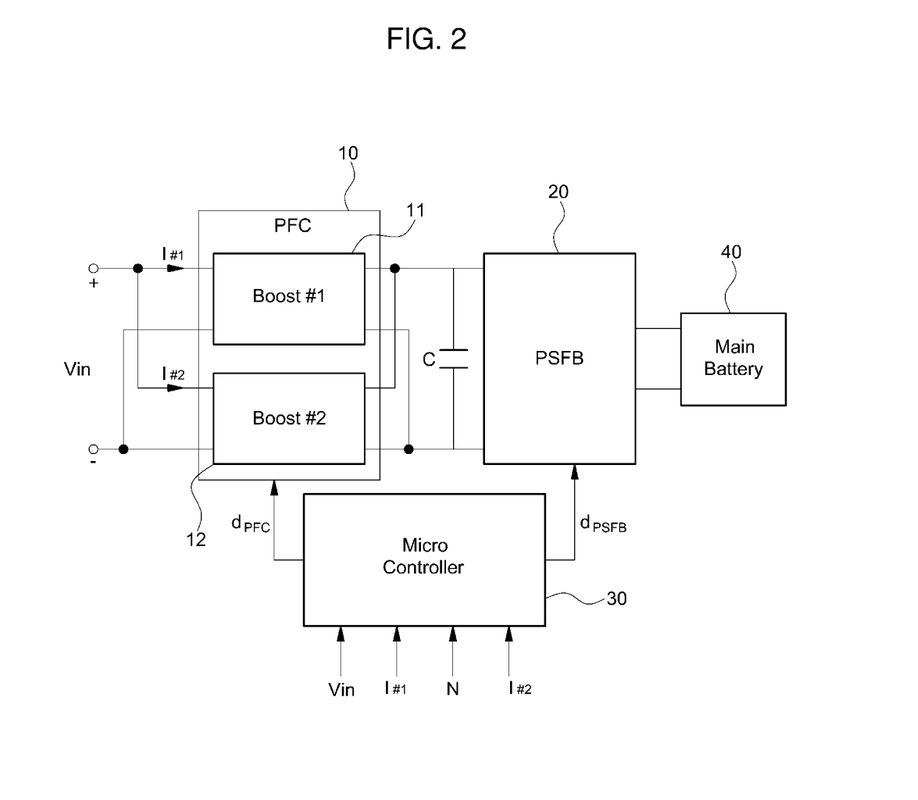
FIG. 2 is a diagram for describing a method of operating an OBC for an eco-friendly vehicle according to an exemplary embodiment of the present invention.

FIG. 2 is a diagram for describing a method of operating an OBC for an eco-friendly vehicle according to an exemplary embodiment of the present invention, and exemplifies a configuration of an OBC including a PFC part 10, a DC/DC converter part 20, and a controller 30 as a vehicle equipped charger connected between a power supplier (not illustrated) extraneous to the vehicle and a battery 40 mounted within the vehicle. The PFC part 10 may include a first boost converter 11 and a second boost converter 12 configured to adjust a duty ratio of a current (e.g., input current) input into the OBC, and the first boost converter 11 and the second boost converter 12 may be configured to adjust an on-duty of the input current while being alternately operated with a phase difference of 180°.

Each of the first boost converter 11 and the second boost converter 12 may include a switching device, such as a metal oxide semiconductor field effect transistor (MOSFET), and may be configured to adjust a duty ratio of the input current when outputting and transmitting the input current applied from the exterior when the switching device is on, and may be configured to transmit an average output current that corresponds to a current command by adjusting the duty ratio of the input current.

The PFC part 10 may operate as a circuit configured to perform a power factor control in the OBC, and may be configured to adjust the duty ratio (or the on-duty) of the input current with two phases by the two boost converters 11 and 12 operated with different phases, and the operation may be executed by the controller 30. When the OBC charges the battery 40 using a commercial power supplier, such as the ICCB, configured to supply household electricity (or a commercial alternating current power source), the controller 30 may be configured to alternately operate the first boost converter 11 and the second boost converter 12 based on the number of times of charging the battery (e.g., number of time the battery is charged). Particularly, the method of operating the OBC by the controller 30 configured to execute an operation sequence of the first and second boost converters 11 and 12 of the PFC part 10 will be described in more detail below.

Figure 3:
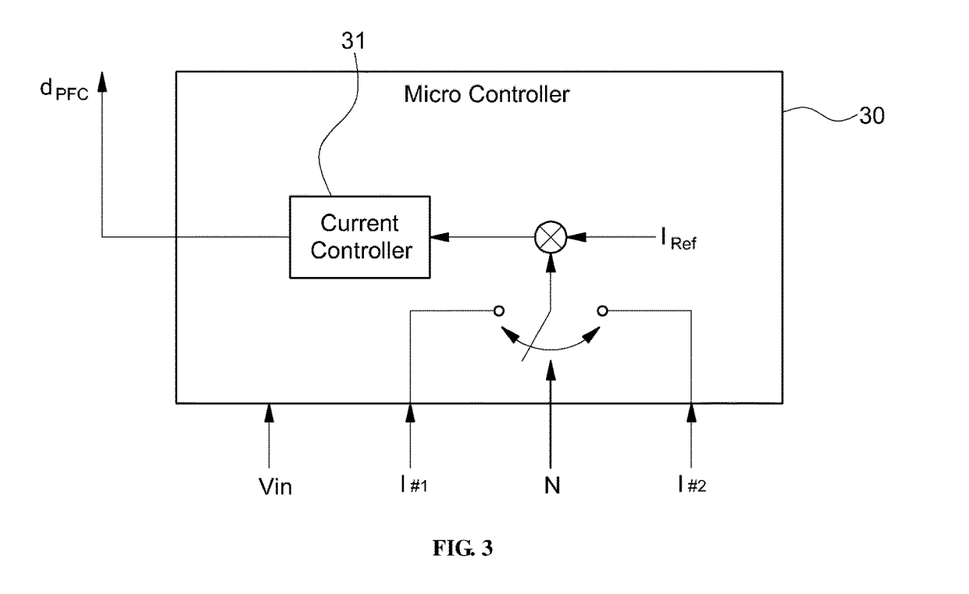
FIG. 3 is a concept diagram illustrating an operation method during the charging using an in-cable control box (ICCB) of a controller for the OBC according to an exemplary embodiment of the present invention.

As illustrated in FIGS. 2 and 3, the controller 30 may be configured to detect an input voltage Vin and input currents $I_{\#1}$ and $I_{\#2}$, which are applied to the OBC, at an input terminal of the PFC part 10, and simultaneously may be configured to detect whether an external power supplier is connected to the input terminal of the PFC part 10.

In particular, the controller 30 may be configured to detect that the commercial power supplier is connected to the input terminal of the PFC part 10 based on charging power applied to the input terminal of the PFC part 10 from the exterior. A charging capacity in charging of the battery using the EVSE may generally be two or more times the charging capacity in charging of the battery using the ICCB. In other words, the controller 30 may be configured to determine whether the power supplier connected to the input terminal of the OBC (or the input terminal of the PFC part 10) is the EVSE or the ICCB based on the input voltage Vin and the input current $I_{\#1}$ and $I_{\#2}$ applied to the first and second boost converters 11 and 12 of the PFC part 10.

When the controller 30 determines that the commercial power supplier (ICCB) extraneous to the vehicle is electrically connected to the input terminal of the PFC part 10, the controller 30 may be configured to increase the number N of times of charging the battery, which may be determined as an internal variable. In particular, the controller 30 may be configured to increase the number N of times of charging the battery by 1 when the commercial power supplier (ICCB) is connected to the input terminal of the PFC part 10, and accumulate and count the number N of times of charging the battery, and operate one boost converter selected from the boost converters 11 and 12 of the PFC part 10 by adjusting a charging mode of the OBC based on the counted number N of times of charging the battery.

In other words, the controller 30 may be configured to execute the operation sequence of the first and second boost converters 11 and 12 of the PFC part 10 based on the number N of times of charging the battery and sequentially and alternately operate the first and second boost converters 11 and 12. For example, when the number N of times of charging the battery is an odd number (N=2k+1, k=0, 1, 2, . . . , and n), the first boost converter 11 may be operated, the input current $I_{\#1}$ of the first boost converter 11 may be selected from the input currents $I_{\#1}$ and $I_{\#2}$ detected at the input terminal of the PFC part 10, and the on-duty of the input current $I_{\#1}$ of the PFC part 10 (or the selectively operated first boost converter) may be adjusted based on a determined current command $I_{ref}$.

Particularly, a current controller 31 disposed within the controller 30 may be configured to determine and output an on-duty $d_{PFC}$ of the input current $I_{\#1}$ based on the current command $I_{ref}$. In other words, an output of the current controller 31 may become the on-duty $d_{PFC}$ of the input current $I_{190\_1}$ input into the selected boost converter, that is, the first boost converter 11. Then, the PFC part 10 may be configured to adjust the on-duty of the input current $I_{\#1}$ based on the determined on-duty $d_{PFC}$ and output an average output current that corresponds to the current command $I_{ref}$.

For example, when the number N of times of charging the battery is an even number (N=2k, k=0, 1, 2, . . . , and n), the second boost converter 12 is selected and operated, the input current $I_{\#2}$ of the second boost converter 12 may be selected from the input currents $I_{\#1}$ and $I_{\#2}$ detected at the input terminal of the PFC part 10, and the on-duty of the input current $I_{\#2}$ of the PFC part 10 (e.g., or the selectively operated second boost converter) may be adjusted based on a determined current command $I_{ref}$. In particular, the current controller 31 mounted within the controller 30 may be configured to determine and output an on-duty $d_{PFC}$ of the input current $I_{\#2}$ based on the current command $I_{ref}$. An output of the current controller 31 may become the on-duty $d_{PFC}$ of the input current $I_{\#2}$ input into the selected boost converter, that is, the second boost converter 12.

Further, the PFC part 10 may be configured to adjust the on-duty of the input current $I_{\#2}$ based on the determined on-duty $d_{PFC}$ and output an average output current that corresponds to the current command $I_{ref}$. For example, when the input current of the boost converter selected from the boost converters of the PFC part 10 is about 20 A, and the current command $I_{ref}$ is about 10, the on-duty $d_{PFC}$ may be determined to be about 0.5 and the average output current may become about 10 A. Particularly, the current controller 31 may be configured to determine the on-duty $d_{PFC}$ of the input current in subordination to a ratio of the current command $I_{ref}$ and the input current ($I_{\#1}$ or $I_{\#2}$), and the switching device of the first boost converter 11 or the second boost converter 12 may be turned on based on a value of the on-duty $d_{PFC}$.

The current command $I_{ref}$ is a command value of the input current, and may be determined in subordination to an input, an output, and an external condition of the OBC, and the like. In other words, the current command $I_{ref}$ may be determined in subordination to the input voltage Vin of the OBC, the input current ($I_{\#1}$ or $I_{\#2}$) of the selected boost converter, an external condition, and the like. The current command $I_{ref}$ is an output value of a voltage controller (not illustrated) mounted within the controller 30, and the voltage controller may be formed as a negative feedback type, and thus, the voltage controller may be configured to automatically and appropriately determine the current command $I_{ref}$ based on the external condition and the input/output value of the OBC during the normal operation.

For example, to charge the main battery 40, the average output current of the PFC part 10 may be determined based on the output required for the DC/DC converter part 20 of the OBC, and the current command $I_{ref}$ may be determined based on the average output current. In other words, the current command $I_{ref}$ may be determined by the voltage controller mounted within the controller 30, and the current controller 31 may be configured to determine the on-duty $d_{PFC}$ of the input current using the current command $I_{ref}$ that is an output value of the voltage controller. Accordingly, when the external commercial power supplier is connected to charge the battery, the PFC part 10 may be configured to generate an output current in different phases by alternately operating the first and second boost converters 11 and 12 by the two-phase interleaving method.

Since the value of the countable number N of times of charging the battery may be limited based on performance of the controller 30, when the number N of times of charging the battery reaches a predetermined maximum value, the number N of times of charging the battery may be reset to an initial value. For example, when the initial value is "0", the maximum value of the number N of times of charging the battery is set to an even value, and when the initial value is "1", the maximum value of the number N of times of charging the battery may be set to an odd value.

As described above, the first and second boost converters 11 and 12 of the PFC part 10 may be operated alternately based on the number N of times of charging the battery, which may be additionally set as the internal variable in the controller 30 of the OBC, and thus, durability and reliability of the OBC may be improved compared to a case where only one specific boost converter is operated as taught by the related art.

Figure 4:
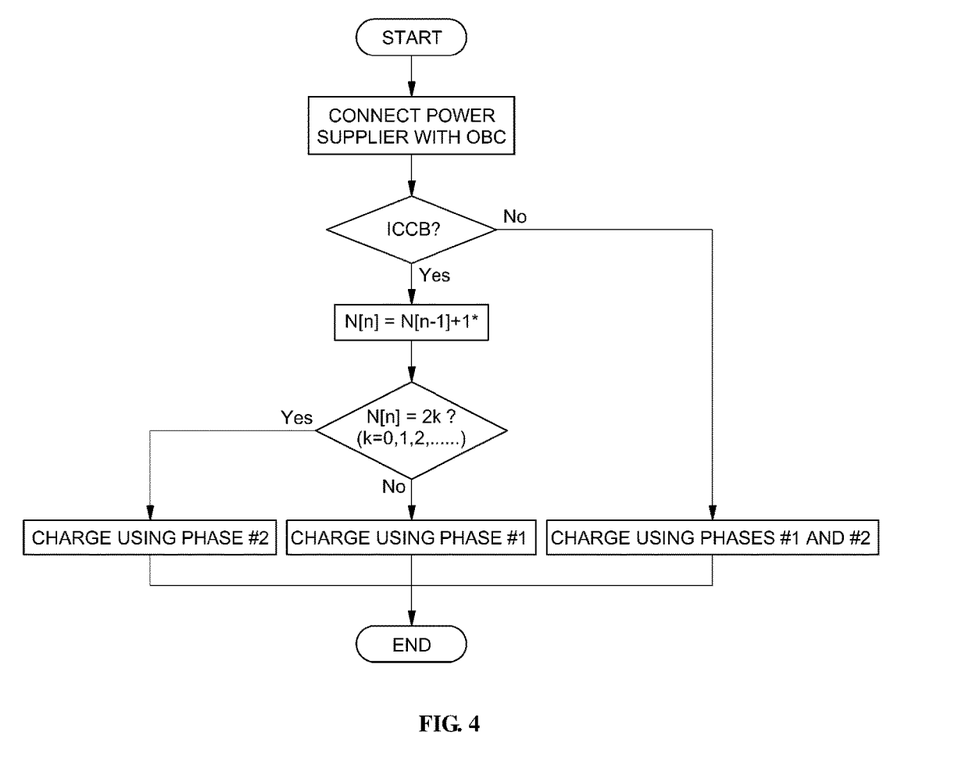
FIG. 4 is a flowchart illustrating the method of operating the OBC according to an exemplary embodiment of the present invention.

An example of a method of operating the OBC according to the present invention will be described below with reference to FIG. 4. As illustrated in FIG. 4, first, when a power supplier extraneous to the vehicle is connected to the OBC, whether the power supplier is a commercial power supplier (ICCB) configured to supply commercial alternating current power may be determined.

In response to determining that the commercial power supplier is connected to the OBC, the number N of times of charging the battery may be increased by 1 and counted, and whether the counted number N of times of charging the battery is an even number may be determined. When the counted number N of times of charging the battery is not the even number (e.g., is an odd number), an input current of the OBC may be adjusted by operating the first boost converter 11, and when the counted number N of times of charging the battery is an even number, the input current of the OBC may be adjusted by operating the second boost converter 12 to charge the battery of the OBC using the commercial power supplier. A method of operating the DC/DC converter part 30 operated by receiving the output current of the PFC part 10 is a publicly known technology, and thus a description thereof will be omitted.

Moreover, FIG. 5 is a graph illustrating a simulation result of the OBC, to which the method of operating the OBC according to an exemplary embodiment of the present invention described above is applied, and FIG. 5 shows that when the number N of times of charging the battery in a case where the ICCB is connected to the PFC part of the OBC is an odd number, an output current of the PFC part flows in a phase of the first boost converter, and when the number N of times of charging the battery is an even number, an output current of the PFC part flows in a phase of the second boost converter.

Figure 5:
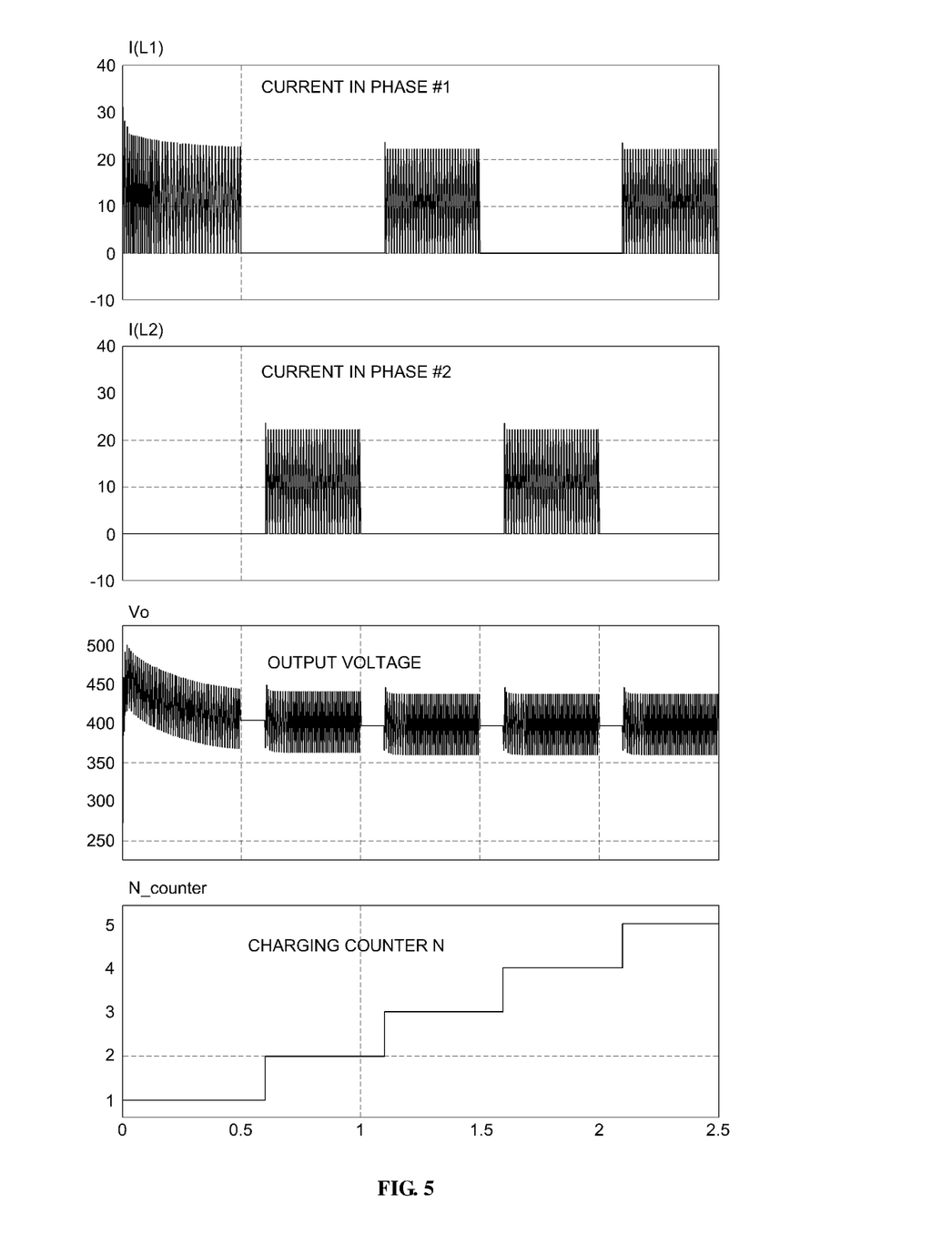
FIG. 5 is a graph illustrating a simulation result of the OBC, to which the method of operating the OBC according to an exemplary embodiment of the present invention is applied.

As illustrated in FIG. 5, the output current of the PFC part when the input current of the PFC part is adjusted by the first boost converter and the output current of the PFC part when the input current of the PFC part is adjusted by the second boost converter may be output in different phases without an overlapping section, and the output voltages of the OBC when the battery charging is performed by the first boost converter and when the battery charging is performed by the second boost converter may be adjusted at the same level.

The present disclosure has been described with reference to the exemplary embodiments, but those skilled in the art may understand that the elements of the present invention may be corrected and modified without departing from the scope of the present invention. Further, special situations or materials may be considerably changed without departing from the essential area of the present invention. Accordingly, the present invention is not limited by the detailed description of the exemplary embodiment of the present invention, and includes all of the exemplary embodiments within the accompanying claims.

What is claimed is:

1. A method of operating an on-board charger (OBC) mounted in a vehicle, comprising:
    determining, by a controller, whether a power supplier connected to the OBC is a commercial power supplier configured to supply commercial alternating current power;
    increasing and counting, by the controller, the number of times of charging a battery charged through the OBC by 1 when the commercial power supplier is connected with the OBC; and
    alternately operating, by the controller, a plurality of boost converters configure to adjust an on-duty of an input current of the OBC based on the counted number of times of charging the battery.

2. The method of claim 1, wherein the on-duty of the input current input into a boost converter selected among the plurality of boost converters based on the number of times of charging the battery is determined in subordination to a ratio of an input current, which is applied to the boost converter selected based on the number of times of charging the battery among the plurality of boost converters and a current command, which is determined as a command value of the input current.

3. The method of claim 1, wherein the OBC includes a first boost converter and a second boost converter configured to adjust the on-duty of the input current in different phases, and when the counted number of times of charging the battery is an odd number, the OBC is configured to adjust the on-duty of the input current by operating one of the first and second boost converters, and when the counted number of times of charging the battery is an even number, the OBC is configured to adjust the on-duty of the input current by operating the other of the first and second boost converters.

4. The method of claim 1, wherein when the accumulated and counted number of times of charging the battery reaches a predetermined maximum value, the number of times of charging the battery is reset to an initial value.

5. The method of claim 1, wherein further comprising:
determining, by the controller, whether the power supplier connected to the OBC is the commercial power supplier based on an input voltage and an input current applied to the plurality of boost converters.

6. A system of operating an on-board charger (OBC) mounted in a vehicle, comprising:
a memory configured to store program instructions; and
a processor configured to execute the program instructions, the program instructions when executed configured to:
determine whether a power supplier connected to the OBC is a commercial power supplier configured to supply commercial alternating current power;
increase and count the number of times of charging a battery charged through the OBC by 1 when the commercial power supplier is connected with the OBC; and
alternately operate a plurality of boost converters configure to adjust an on-duty of an input current of the OBC based on the counted number of times of charging the battery.

7. The system of claim 6, wherein the on-duty of the input current input into a boost converter selected among the plurality of boost converters based on the number of times of charging the battery is determined in subordination to a ratio of an input current, which is applied to the boost converter selected based on the number of times of charging the battery among the plurality of boost converters and a current command, which is determined as a command value of the input current.

8. The system of claim 6, wherein the OBC includes a first boost converter and a second boost converter configured to adjust the on-duty of the input current in different phases, and when the counted number of times of charging the battery is an odd number, the OBC is configured to adjust the on-duty of the input current by operating one of the first and second boost converters, and when the counted number of times of charging the battery is an even number, the OBC is configured to adjust the on-duty of the input current by operating the other of the first and second boost converters.

9. The system of claim 6, wherein when the accumulated and counted number of times of charging the battery reaches a predetermined maximum value, the number of times of charging the battery is reset to an initial value.

10. The system of claim 6, wherein the program instructions when executed are further configured to:
determine whether the power supplier connected to the OBC is the commercial power supplier based on an input voltage and an input current applied to the plurality of boost converters.

* * * * *